H. C. KUNKLE.
OFF-BEARING MACHINE FOR BRICKMAKING.
APPLICATION FILED APR. 25, 1912.

1,129,208.

Patented Feb. 23, 1915.
6 SHEETS—SHEET 2.

WITNESSES
Jos. J. Hosler.
Sylvia Boron.

INVENTOR
Harry C. Kunkle.

BY
Bond & Miller
ATTORNEYS

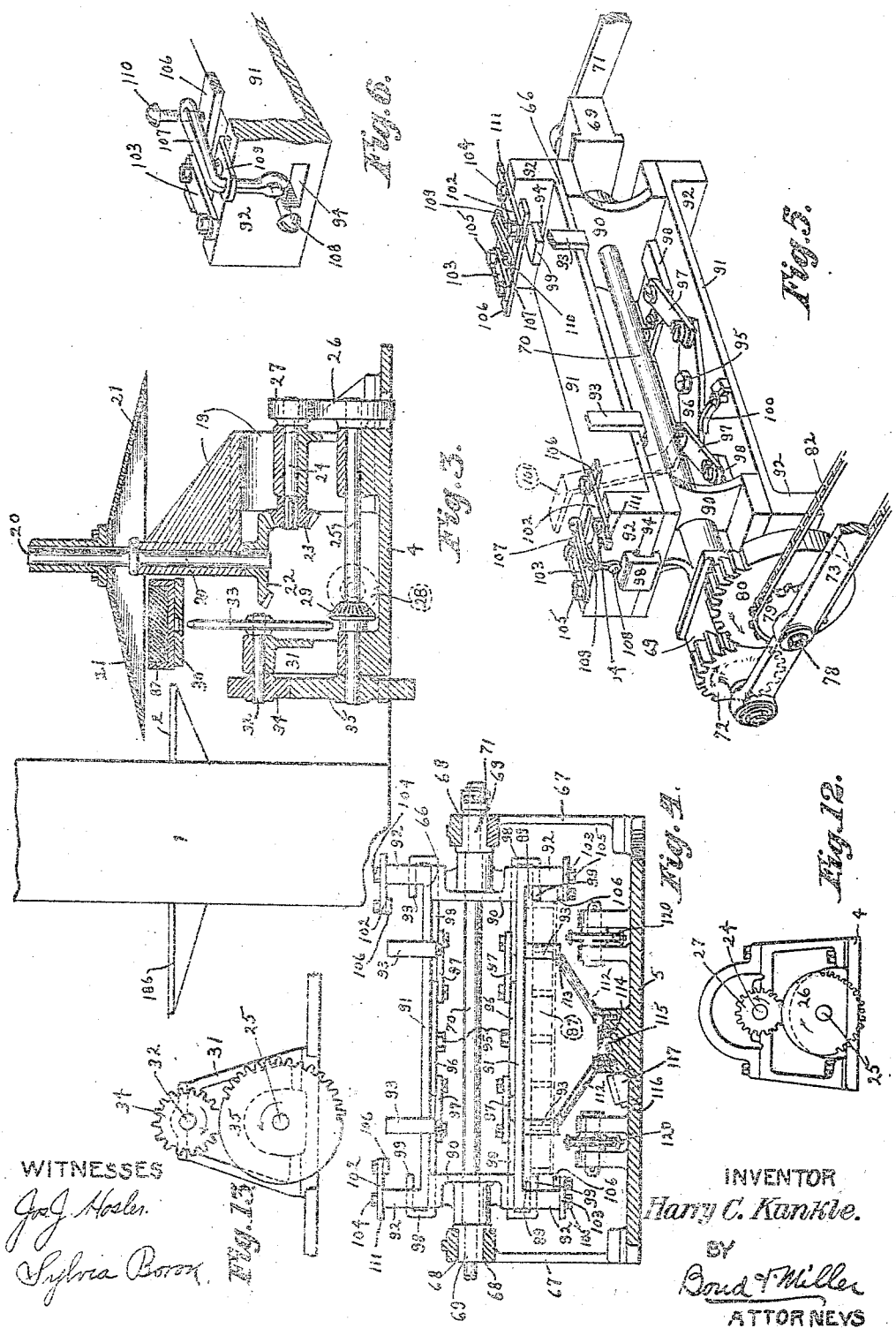

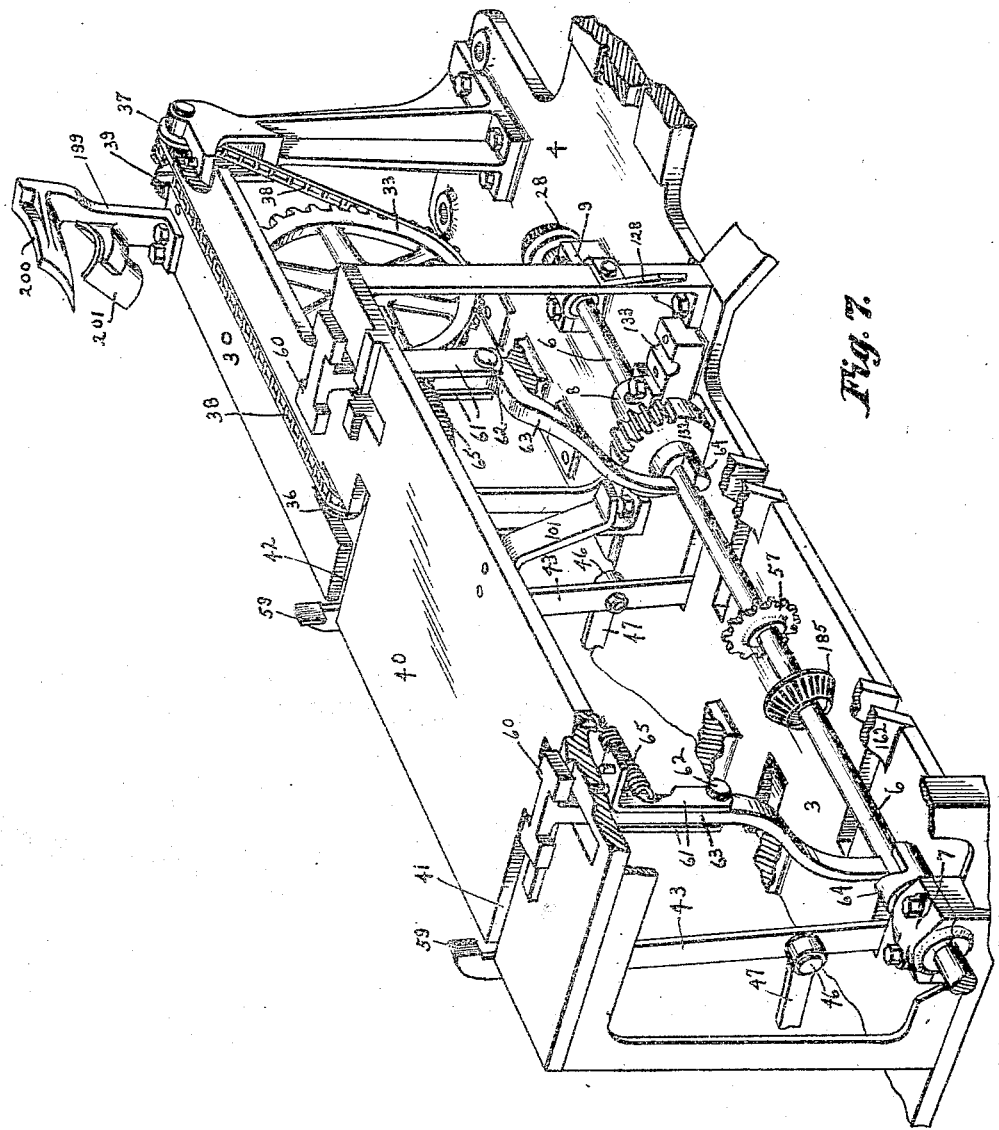

H. C. KUNKLE.
OFF-BEARING MACHINE FOR BRICKMAKING.
APPLICATION FILED APR. 25, 1912.
1,129,208.
Patented Feb. 23, 1915.
6 SHEETS—SHEET 5.
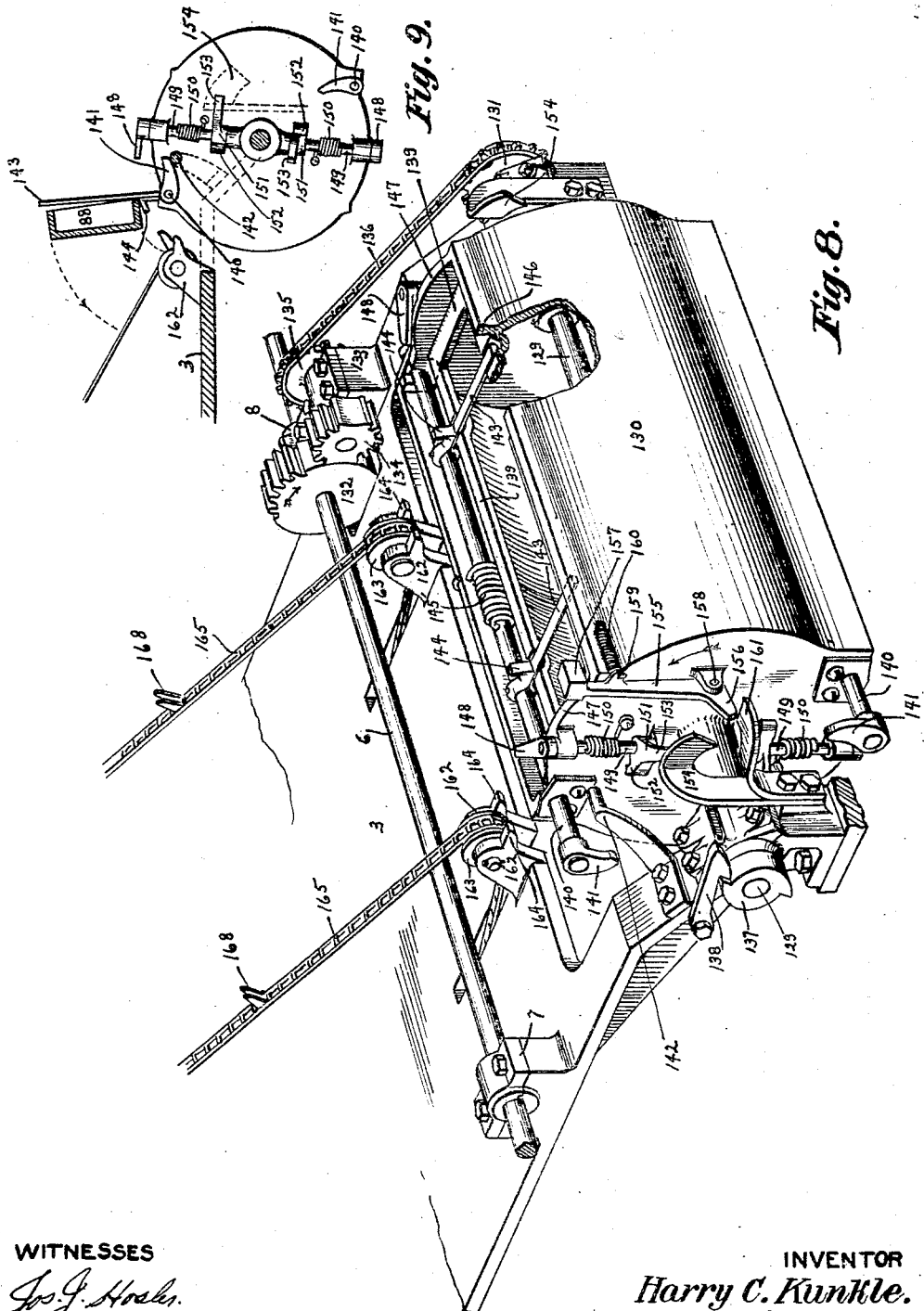
WITNESSES
INVENTOR
Harry C. Kunkle.
BY
ATTORNEYS

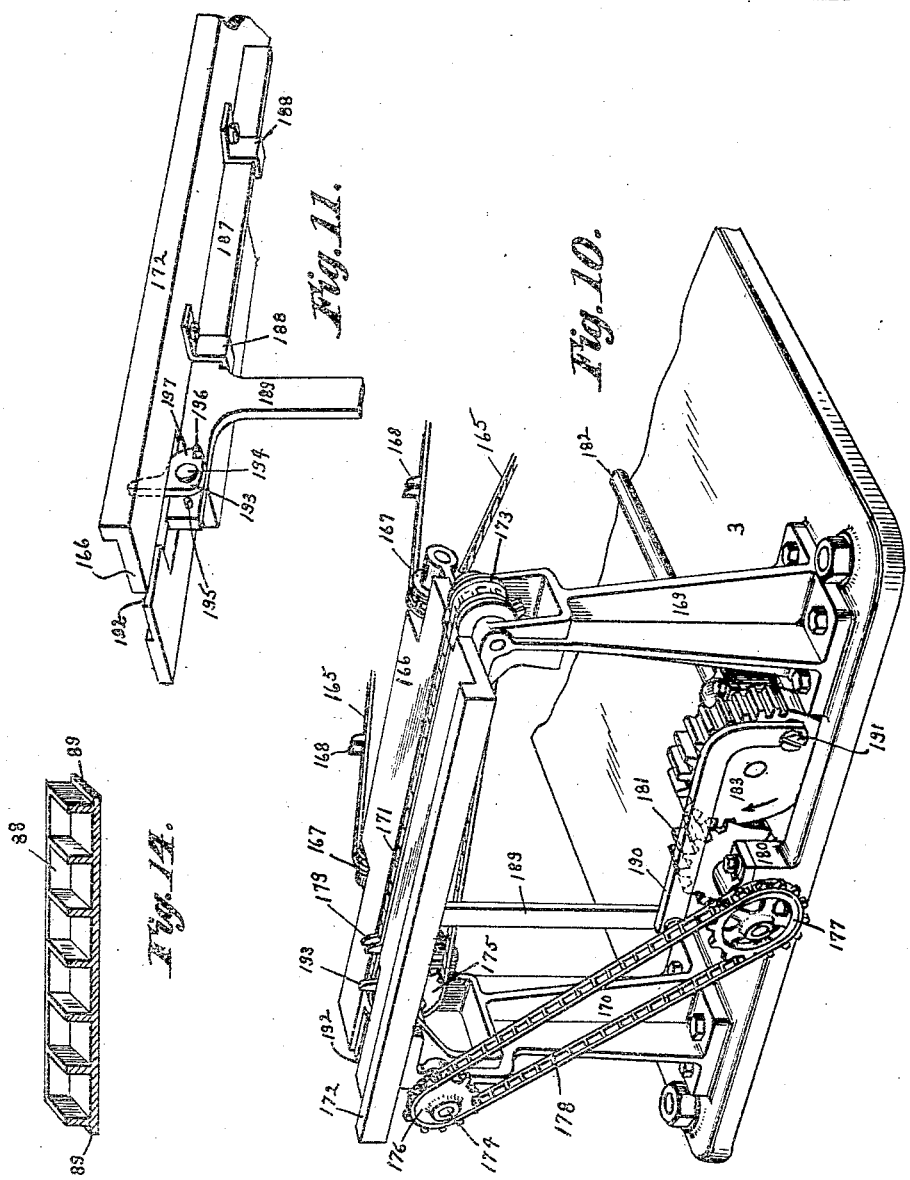

UNITED STATES PATENT OFFICE.

HARRY C. KUNKLE, OF CANTON, OHIO, ASSIGNOR OF ONE-FOURTH TO OSCAR J. METZGER, ONE-FOURTH TO CHARLES W. METZGER, AND ONE-FOURTH TO CHARLES B. SLUTZ, ALL OF CANTON, OHIO.

OFF-BEARING MACHINE FOR BRICKMAKING.

1,129,208.  Specification of Letters Patent.  Patented Feb. 23, 1915.

Application filed April 25, 1912. Serial No. 693,135.

*To all whom it may concern:*

Be it known that I, HARRY C. KUNKLE, a citizen of the United States, residing at Canton, in the county of Stark and State of Ohio, have invented a new and useful Off-Bearing Machine for Brickmaking, of which the following is a specification.

My invention relates to improvements in machines designed for the purpose of off-bearing or carrying away from a brick machine a mold of pressed brick, stroking or shaving off the exposed surfaces of the bricks in said mold, rapping the mold, emptying the bricks from said mold upon a board or pallet, resanding the mold thus emptied and returning it, and placing it in the brick machine for the purpose of receiving a new supply of clay, pressing, and again going through the cycle of operations just described.

Figure 1:
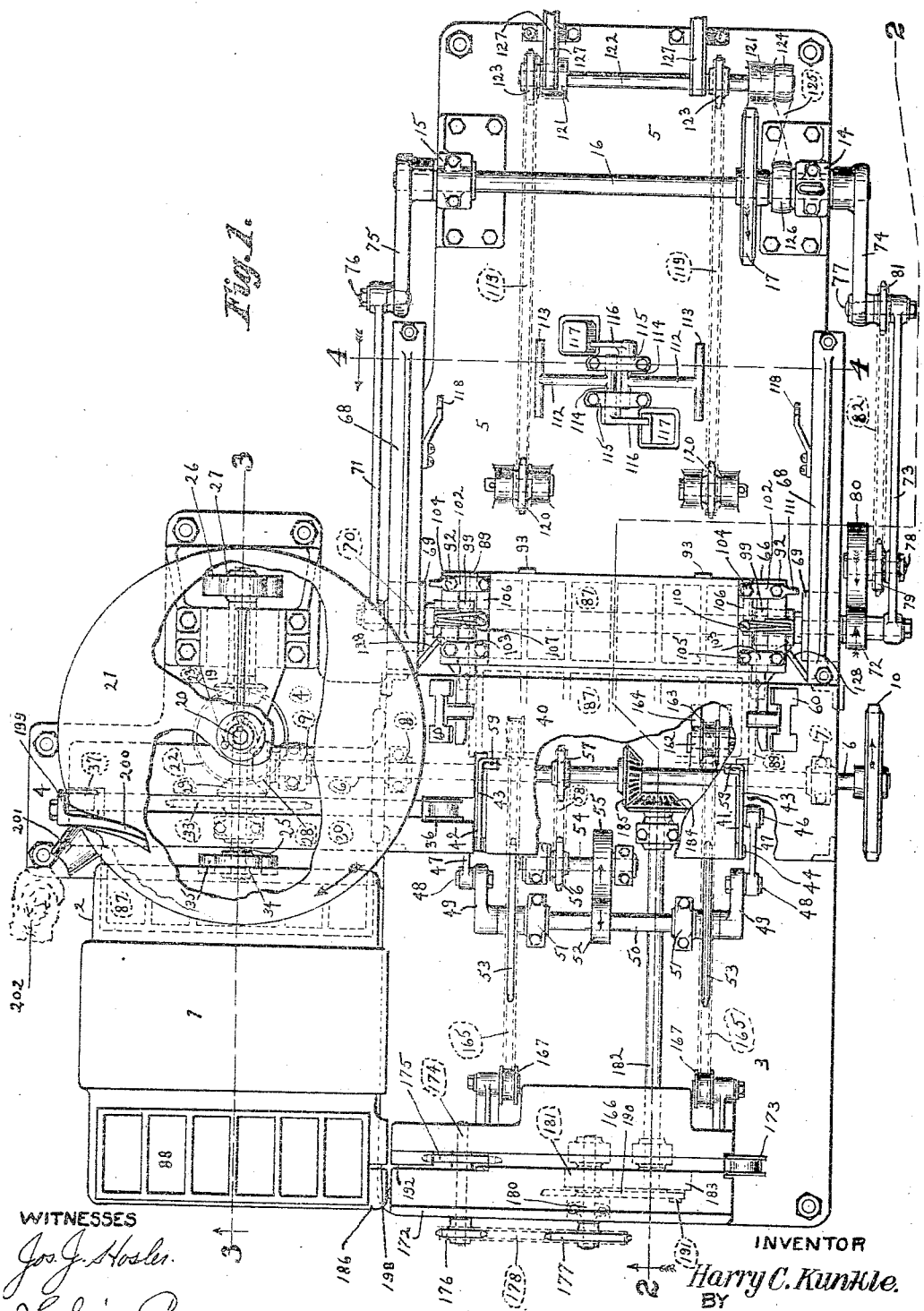
Figure 2:
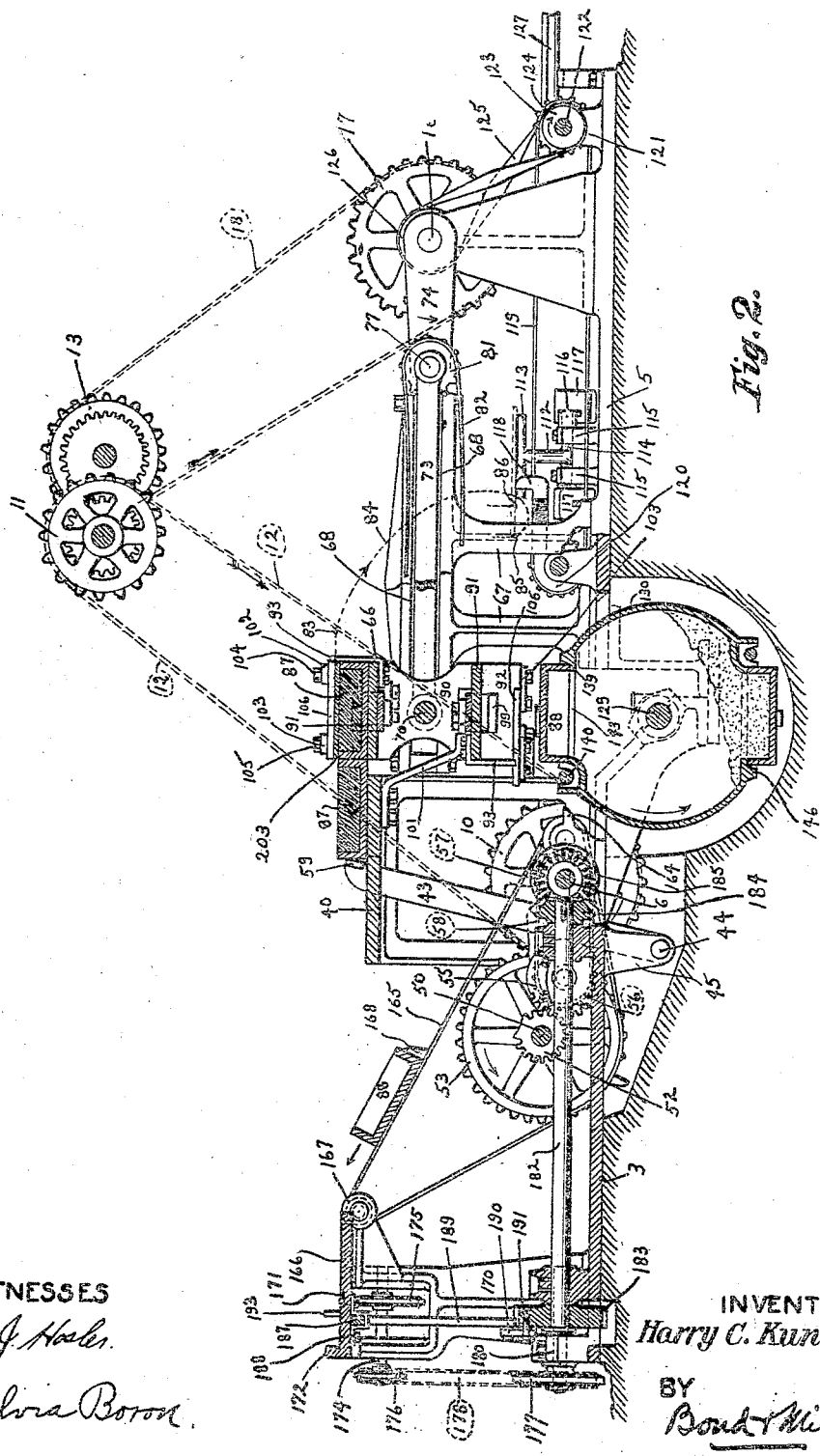

The invention comprises in one machine a novel combination of devices adapted to perform the various functions just mentioned and the prime object is to provide a machine which will automatically off-bear the molds of brick from a brick machine and perform the various acts hereinbefore broadly mentioned, thus reducing the number of laborers necessary in brickmaking, performing the various operations with precision and rapidity and increasing the output, while at the same time reducing the cost thereof. These objects, together with minor objects apparent to those skilled in the art I attain by the mechanism illustrated in the accompanying drawings, in which:

Figure 1 is a top view of my off-bearing machine for brickmaking in connection with a press, portions of the off-bearing machine being broken away to more fully disclose its construction and brick molds and certain portions of the machine illustrated in dotted lines. Fig. 2 is a longitudinal vertical section of the off-bearing machine upon the section line 2—2, of Fig. 1, and also illustrating the method of driving said machine from the counter-shaft. Fig. 3 is a vertical section upon the section line 3—3 of Fig. 1. Fig. 4 is a view partly in section, said view being taken on the line 4—4, of Fig. 1. Fig. 5 is a perspective view of the rotatable reciprocating dumping cradle showing its related parts and some of the same broken away. Fig. 6 is a fragmentary perspective view of a portion of the end of the cradle illustrating the construction of the double-shifting pallet retaining device arranged thereon. Fig. 7 is an enlarged fragmentary view in perspective illustrating that portion of the machine which has to do with the removal of the mold from the stroking-off table to the rapping table and also illustrating the rapping table and rapping means in some detail. Fig. 8 is an enlarged fragmentary perspective view of the rotating sanding barrel and its immediately related mechanism. Fig. 9 is an end view of the sanding barrel and a portion of the conveyer therefrom and illustrating the operation of discharging the sanded mold from said sanding barrel upon said conveyer. Fig. 10 is an enlarged fragmentary view in perspective illustrating the upper end of the conveyer from the sanding barrel and also the mold receiving table and mold returning mechanism connected therewith. Fig. 11 is an enlarged fragmentary perspective view from the underside of the mold receiving table. Fig. 12 is an elevation of the intermittent gear used in connection with the stroking-off knife. Fig. 13 is an elevation of the intermittent gear for driving the conveyer chain to convey the molds to the rapping table. Fig. 14 is a perspective section of one of the molds.

Throughout the several views similar numerals of reference indicate similar parts.

The numeral 1 indicates a brickmaking machine wherein molds of, say, six bricks each are filled and pressed and when so filled and pressed are pushed out upon the table 2. The brickmaking machine in itself forms no part of the present invention, which has to do with the treatment and handling of the molds and bricks after the brick machine has completed its work but the present machine is designed to be used in connection with or as an attachment for such brickmaking machine as just described.

My invention as an entirety includes coöperative devices for stroking off the bricks, rapping the molds, emptying the bricks, resanding the molds and returning them to the brick machine, the means by which these various acts are done together with the means for conveying and handling the molds and brick being hereinafter fully set forth.

All parts of the off-bearing machine herein described are mounted upon the frame or connected to the base plates 3, 4 and 5 arranged upon and fastened to a level foundation in their appropriate relation to each other as shown in the drawings. The main shaft 6 is rotatably mounted within the bearings 7 and 8 upon the base 3 and the bearing 9 on the base 4. The main shaft 6 is provided with the main driving sprocket 10 which is connected to the sprocket 11 on the counter-shaft by means of the driving chain 12. A supplementary counter-shaft is provided with the sprocket 13 and the sprockets 13 and 11 are each provided with a gear meshing with the gear on the other sprocket to produce simultaneous rotation of the said two sprockets. In elevated bearings 14 and 15 the rotatable shaft 16 is mounted and fixedly arranged upon said shaft is the sprocket 17, which is connected to the sprocket 13 upon the supplementary counter-shaft by the driving chain 18. It will thus be obvious that rotation of the sprocket 11 will produce rotation of the sprocket 13 and that the shaft 6 and the shaft 16 will be driven simultaneously and in harmony with each other by reason of the geared connection between the said sprockets 11 and 13.

Upon the base-plate 4 is arranged the support 19, which is provided with a vertical bearing for the accommodation of the rotatable shaft 20. Upon the upper end of the shaft 20 is fixedly mounted the circular stroking off knife 21, the flat, hollow, frusto-conical form of which will be understood from a reference to Fig. 3, which includes a cross section of said knife upon what may be termed a diametrical plane. Upon the lower end of the shaft 20 is arranged the beveled gear 22, meshing with the beveled gear 23, which is fixedly mounted upon the shaft 24 journaled in a bearing on the support 19. The shaft 25 is rotatably mounted in suitable bearings upon the base 4 and is provided with the gear 26 meshing with the gear 27 upon the shaft 24. The gears 26 and 27 together constitute a single intermittent gear and a view of said gear is shown in Fig. 12. It will be obvious that although the gear 26 is continuously in rotation, the rotation of the gear 27 will be intermittent.

The main shaft 6 is provided at its extreme end with the beveled gear 28, meshing with the beveled gear 29, upon the shaft 25, the shaft 25 being thus driven by the shaft 6. The table 30 is arranged under the circular stroking off knife and the upper surface of said table is slightly lower than the upper surface of the table 2 of the brick machine for the purpose hereinafter disclosed. Upon the support 31 is arranged a bearing within which the shaft 32 is journaled. Mounted upon said shaft 32 is the sprocket 33, and at the opposite end of the gear 34 meshing with the gear 35 upon the shaft 25. An elevation of the gears 34 and 35 is shown in Fig. 13, from which it will be obvious that although the gear 35 is continuously rotated the gear 34 will only be intermittently driven by the gear 35, causing an intermittent rotation of the sprocket 33 for the purpose hereinafter more fully disclosed. The idler pulleys 36 and 37 are suitably journaled to extensions of the table 30 and a conveyer chain 38, is located over said idlers along the top of the table 30 in a slot or depression in the surface of said table, and over a portion of the sprocket 33 as illustrated in Fig. 7. The chain 38 is provided with the adjustable fingers 39 which may be attached to one of the links of said chain and are adapted to engage the mold for the purpose of removing the same from the table 30 by sliding it longitudinally onto the rapping table 40, which may be formed integrally with the table 30 as shown in Fig. 7 if so desired. In the rapping table 40 the transverse slots 41 and 42 are provided to permit the reciprocating movement of the upper ends of the pushing levers 43—43. These levers extend through slotted openings in the base plate 3 and are pivoted at points 44, to downward extensions 45 of the base plate 3. At the points 46—46 the pitmen 47—47 are pivotally connected to the pushing levers 43—43, and the said pitmen are connected by the wrist pins 48—48 to the cranks 49—49 fixedly mounted upon the shaft 50. The shaft 50 is rotatably mounted in the bearings 51—51 and the gear 52 is fixedly mounted upon said shaft intermediate said bearings. On the shaft 50 are also mounted the sprockets 53—53 which are provided for the purpose hereinafter disclosed. Upon the rotatable shaft 54 journaled in suitable bearings is fixedly mounted the gear 55 meshing with the gear 52, the form of said gears being such as to produce a single intermittent gear connection between the shafts 54 and 50 as will be more fully disclosed by a reference to Fig. 2, the arrangement of the said gears being such that continuous rotation of the gear 55 will produce continuous rotation of the gear 52 and the shaft 51 upon which said gear is mounted. The sprocket 56 is fixedly mounted upon the shaft 54 and the sprocket 57 is fixedly mounted upon the shaft 6 and the chain 58 operatively connects said sprockets and transmits power from the main shaft 6 to the shaft 54 and the shaft 50 geared thereto. It is obvious that continuous rotation of the shaft 6 will produce continuous rotation of the shaft 54, and that the gears 55 and 52 will produce intermittent rotation of the shaft 50 carrying with it the sprockets 53—53 and the cranks 49—49. Rotation of the cranks 49—49 will produce reciprocating movement of the pushing levers 43—43 by reason of the connecting pitmen, the said pushing levers moving upon their pivotal points 44. At the top end of the pushing levers are arranged the mold engaging flanges 59—59, which are adapted to engage the side of the mold and push the same across the table 40 into a position where it may be acted upon by the rapping hammers 60—60.

The spaced hammer brackets 61—61 are fixedly attached in pairs to the lower side of the table 40 and upon pins, 62—62, extending between the two brackets of each pair the lever portions 63 of the rapping hammers are pivoted. The lower ends of the said lever portions 63 extend to the main cam shaft 6 where they are engaged by the cams 64—64 adapted to give reciprocating motion to the lower ends of the said lever portions thus rocking the rapping hammers upon the pivotal points 62. To aid in the operation of said hammers the springs 65 are provided one end of each spring being fastened to the lever portion 63 at a point above the pivotal point 62 and the other end being fastened to the underside of the rapping table 40 as illustrated in Fig. 7. It is obvious that the continuous rotation of the main shaft 6 will produce a rapping action on the part of the hammers 60 and that when the mold has been pushed by the levers 43—43 into a position between the rapping hammers the said hammers will engage the ends of said mold and rap the same for the purpose of loosening the bricks therein. The mold will remain upon the rapping table and will be continuously rapped by the hammers 60 until a new mold has been moved onto the table 40 by the operation of the conveyer chain 38 and the fingers 39 and until the pushing levers 43 have pushed the second mold into the position previously occupied by the first mold between the rapping hammers thus pushing or crowding the mold which has been rapped off of the rapping table and onto the rotatable reciprocating dumping cradle 66, the construction and operation of which are now to be described.

Upon the base 5 are erected the supports 67 having arranged upon their upper ends the cradle ways 68 forming longitudinal grooves on each side of the machine and thus providing a slot or track within which the bearing blocks 69 are adapted to be arranged for longitudinal sliding movement. The cradle axle 70 upon which the cradle 66 is fixedly mounted is rotatably journaled in bearings in the said bearing blocks 69 and extends through said blocks, on the one side being pivotally attached to the pitman 71 and on the other side of the machine having the gear 72 fixedly mounted thereon, extending beyond said gear and having pivotal attachment to the pitman 73.

The arrangement and mounting of the shaft 16 in the elevated bearings 14 and 15 and the means for rotating the shaft 16 by the chain 18 have been heretofore described. Beyond the bearings 14 and 15 and upon the shaft 16 are fixedly mounted the cranks 74 and 75 respectively, which two cranks are of the same length. The pitman 71 is pivotally connected to the wrist pin 76 on the crank 75 and the pitman 73 is pivotally connected to the wrist pin 77 on the crank 74.

Fixedly attached to the pitman 73 is a stud 78 upon which is rotatably mounted the sprocket 79 and gear 80, said sprocket and gear being fixedly attached to each other and adapted to rotate together upon the stud 78. By a reference to Fig. 5 it will be seen that the teeth in the gear 72 are broken away at two places, and the gear 80 is provided with teeth for only a portion of its circumference; it will be obvious from this that one complete rotation of the gear 80 will produce one-half rotation of the gear 72 and that continuous rotation of the gear 80 will produce intermittent rotation of the gear 72, the gears 80 and 72 thus constituting what may be termed a double intermittent gear.

Fixedly attached to the crank 74 and concentric with the wrist pin 77 is the sprocket 81. It will be understood that the sprocket 81 will rotate with the crank 74 with the rotation of the shaft 16, but that no rotation will take place as between the sprocket 81 and the said crank 74. The sprocket 79 and the sprocket 81 are connected by the chain belt 82. It will be obvious that rotation of the shaft 16 will produce rotation of the cranks 74, carrying with them the pitman 71 and 73 and dumping cradle 66 attached thereto, the bearing blocks 69 sliding longitudinally within the cradle ways 68. It should also be noted that during rotation of the crank 74 the sprocket 81 being connected thereto will make one revolution with respect to the sprocket 79 and that the chain belt 82 extending between said sprockets will produce one complete revolution of the sprocket 79 for each rotation of the crank 74. From the previous description of the relation of the gears 72 and 80 it will be readily apparent that one complete rotation of the crank 74 will not only produce reciprocating movement of the cradle within the ways 68 but will also produce one-half revolution of said cradle itself.

The relative positions of the gears 72 and 80 illustrated in Fig. 5 is the position which said gears occupy with reference to each other at the time when the cranks 74 and 75 are in their most rearward direction as illustrated in Figs. 1 and 2. It will be evident therefore that the said cranks 74 and 75 will continue to rotate for a short distance before the teeth in the gear 80 are brought to mesh with the teeth in the gear 72. Because of this fact the cradle 66 will move in the ways 68 for a short distance illustrated in dotted lines at 83 of Fig. 2 before the said cradle begins to revolve. When the cradle has reached the point 83, however, the gears 80 and 72 begin to mesh and the cradle is revolved, describing the curve illustrated in dotted lines at 84 in Fig. 2 until the point 85 is reached. This point 85 is reached before the cranks 74 and 75 have completed a half revolution, and the gears 72 and 80 being now no longer in mesh the cradle will remain at rest in so far as rotation is concerned, and while the cranks 74 and 75 proceed in their rotation to the point diametrically opposite that illustrated in Figs. 1 and 2 the cradle will be moved in a straight line illustrated by the dotted lines between the points 85 and 86 in Fig. 2. As the cranks 74 and 75 complete their revolution to the position illustrated in Figs. 1 and 2 the gears 80 and 72, still remaining out of mesh, the cradle 66 will continue without rotation until the cranks 74 and 75 assume a point in their rotation slightly beyond the point illustrated in Figs. 1 and 2 when another half revolution of the cradle will take place in the same manner as that just described.

In the drawings 87—87 represent molds containing bricks, while 88—88 indicate empty molds. Each mold is formed with bottom, ends and sides and has transverse partitions to form the individual brick molds between said partitions. A longitudinal section of one of said molds is illustrated in Fig. 14 where it will be noted that the bottom projects slightly beyond each end of the mold, producing the flanges 89 for the purpose hereinafter set forth.

The cradle 66 is provided with the ends 90—90 through a portion of which passes the cradle axle 70, and which are fixedly attached to said axle. The cradle bottoms 91—91 extend between the ends 90 and are supported by and attached to said ends. The end flanges 92—92 are preferably formed integrally with the cradle bottoms and support the mold and pallet retaining devices hereinafter described. Upon each cradle bottom and at the side away from the rapping table when the cradle bottom is in its upward position are arranged the mold stops 93—93, which are fixedly attached to the cradle bottom and prevent the mold and pallet from sliding sidewise out of the cradle in the direction of said stops, while the cradle is rotating with the mold.

While the mold is yet upon the rapping table and just previous to its being pushed by the pushing levers 43 onto the upturned cradle bottom an attendant standing by should place a pallet or board upon and across the top of the mold, said board or pallet being exactly as wide and as long as the mold proper not including the flanges 89. Said pallet is intended to lie loosely upon the top of the mold and is not fastened to the same while on the rapping table. When the pushing levers 43 bring a new mold into engagement with the mold just rapped and push the said rapped mold onto the upturned cradle bottom the pallet is carried with said mold, the mold and the pallet sliding upon the cradle bottom between the end flanges 92 into the position illustrated in Fig. 2. Through each end flange 92 extends a slot, 94. The bottom of said slot is elevated from the surface of the cradle bottom a distance equal to or slightly greater than the thickness of the bottom of one of the molds, or in other words a distance equal to the thickness of the flange 89. Pivotally arranged upon the pin 95 at the center of the under side of each cradle bottom is the lever 96 to which is pivotally attached at each end a connecting link 97 which connecting link is in turn pivoted to one end of the slidingly adjustable mold engaging device 98. The mold engaging device 98 extends through a slot in the end 90 of the cradle, in which slot it is slidable longitudinally, and upon the outside of the said end the said device is bent at right angles parallel with the outside end surface of the end flange 92, and is again bent at right angles to enter the slot 94 and extend through the same and beyond the inner surface of said flange as shown at 99 in Figs. 4 and 5. The portion of the mold engaging device which thus extends through the slot 94 and beyond the inner surface of the flange 92 may be called the mold engaging finger or more properly speaking the flange-engaging finger, as the same is adapted to engage the flange 89 on the mold at each end. When the mold is pushed onto the cradle bottom the flanges at the ends of said mold slide under the flange engaging finger, the said finger being raised slightly farther from the surface of the cradle bottom than the thickness of said flange as heretofore described. It will be understood that if the lever 96 be moved upon the pin 95 as its pivotal point the mold-engaging device will be moved longitudinally and the flange engaging fingers will be drawn back and out of engagement with the flanges 89. For the purpose of normally holding the lever 96 in such position as to cause the flange engaging fingers to engage the flanges of the molds the spring 100 is provided, which spring is fastened to the under side of the cradle bottom and bears against the lever 96 in the manner illustrated in Fig. 5. For the purpose of operating the lever 96 and actuating the flange-engaging fingers connected thereto the trip 101 is provided which trip is attached to the lower side of the rapping table 40, as best illustrated in Fig. 7, and extends in such position and direction that when the dumping cradle has reached its extreme rearward position, as illustrated in Fig. 2, the said trip will engage the lever 96 upon the cradle bottom which is turned downward at the time, as illustrated in Fig. 5, and by engaging said lever 96 at one of its ends, will withdraw the flange engaging fingers of the lower cradle bottom for the purpose of releasing the mold to permit it to drop upon the sanding barrel as hereinafter fully described. As previously explained, when the mold is pushed onto the cradle bottom the pallet or board placed upon the top of said mold is not fastened thereto. As the mold is moved onto the cradle bottom the flanges 89 of said mold enter the spaces between the flange engaging fingers 99 and the surface of the cradle bottom and the pallet on the top of said mold slides with said mold into place under the pallet retaining devices mounted upon the flanges 92, the said devices being elevated above the surface of the cradle bottom just such a distance as to readily permit the mold with the pallet on top thereof to slide beneath them.

Each pallet retaining device consists of the pivoted arms 102 and 103 pivoted at the points 104 and 105 respectively to the end flange 92. These arms are pivotally attached at their opposite ends to the pallet-engaging plate 106, the said arms being in parallel spaced relation and adapted to swing upon their pivots to bring the said pallet-engaging plate back closer to the flange 92. For the purpose of normally holding the pallet-engaging device in its extended position as illustrated in Fig. 5 the simple spring 107 is provided, which is attached to the flange 92 by the screw 108 and the fastening plate 109 and is pivotally connected to the mold engaging plate 106 by the screw 110. The arm 102 has a projection 111, and this projection is for the purpose of engaging appropriate trips for the purpose of actuating the arms upon their pivotal points as hereinafter fully described.

It will be understood from the above description that the mold with the pallet arranged thereon is pushed onto the dumping cradle, and that the mold stops 93 prevent the mold and pallet from sliding off from the cradle bottom while the cradle is rotated and moved forward, and that the flange-engaging fingers 99 prevent the mold from falling out of the cradle while the pallet-retaining devices hold the pallet, and thereby the bricks, in place during the said revolution and forward movement of the cradle. As heretofore described, the cradle makes one half-rotation as it advances forward, as shown in the dotted curve 84 in Fig. 2.

At a point directly beneath the mold when the cradle has made one half-rotation and is at its extreme forward position is arranged the pallet-receiving and lowering device. The said device consists of two arms 112—112 provided at their free ends with the integral cross-heads 113—113. At the opposite end of each arm is a second and shorter cross head 114, by which the said arm is pivoted in the bearings 115—115 arranged upon the base-plate 5. The cross-head 114 is extended at one side through one of the bearings 115 and is provided with the weight arm 116 which is keyed to said cross-head. The weight arm preferably does not extend in line with the arm proper but at an obtuse angle therewith as shown in dotted lines in Fig. 4. Upon the weight arm is slidably arranged the weight 117, which weight may be adjusted upon said arm at various distances from the pivotal point or second cross-head 114. The weight arm and the arm proper being thus connected and pivotally arranged within the bearings 115, it will be understood that the weights 116 upon the two weight arms will normally tend to hold the arms with their cross heads in the upwardly extending position shown in Fig. 4. The device is so adjusted that the cross-heads when in their said upward position will be closely adjacent to the pallet on the mold which has been reversed by the rotation of the dumping cradle 66 (see Fig. 4).

As previously described, the cradle 66 after it has made its complete half-rotation, moves in a straight line forward the distance between the points 85 and 86 shown in Fig. 2. Arranged upon and connected to two of the supports 67 are the trips for the pallet-retaining devices, said trips being numbered 118 in the drawings. When the cradle is moved forward from the point 85 to the point 86 the trips 118 engage the projections 111 on the arms 102, thus shifting the pallet-retaining devices by moving the arms upon their pivotal points as heretofore described and bringing the pallet-retaining plates 106 instantly closer to the flanges 92, thus permitting the pallet to drop from the mold, the bricks having been loosened by the operation of the rapping hammers 60 also dropping out of said mold with the said pallet. The pallet thus loosened from the pallet-retaining devices is deposited upon the cross-heads of the arms 112. The adjustment of the weights 117—117 upon the weight arms 116—116 is such that the weight of the pallet and bricks upon the cross-heads overcomes the resistance of the said weights in a comparatively slow and steady manner, permitting the cross-heads to lower under the weight of the pallet and bricks, as shown in Fig. 4, until the said arms have lowered sufficiently to deposit the said pallet upon the conveyer chains 119—119.

In suitable bearings raised from the base plate 5 the sprockets 120—120 are rotatably mounted. In the bearings 121—121 the shaft 122 is rotatably mounted and upon said shaft are fixedly arranged the sprockets 123—123. The chains 119 extend from the sprockets 120 to the sprockets 123 providing an endless conveyer upon which the pallet with the bricks, when lowered by the arms 112 may be carried out and away from the machine. For the purpose of rotating the shaft 122 and conveying said bricks upon the chains 119 the pulley 124 is fixedly mounted upon the shaft 122 and a twisted belt 125, connects said pulley 124 with the pulley 126 upon the shaft 16. The shaft 16 being in continuous rotation, it will be understood that the shaft 122 will be in continuous rotation and that the pallet with the bricks thereon will thus be carried by the conveyer chains 119 to the edge of the machine where they will be deposited upon the pallet-receiving rails 127—127 from which point they may be carried by workmen or may be further conveyed by power to the dry kiln as desired. At the time when the pallet-retaining devices are shifted and permit the pallet and bricks to drop from the cradle the flange-engaging fingers 99 remain unmoved and retain the empty mold in its position in the cradle until the said cradle has reached its extreme rearward position shown in Fig. 2. As the cradle nears the extreme rearward position the trip 101, heretofore described engages one end of the lever 96 on the lower cradle bottom, as illustrated in Fig. 5 in dotted lines, and by the continued motion of the said cradle into its said extreme rearward position, the said trip causes the said lever to be moved on its pivotal point, thus actuating the various parts connected therewith as heretofore described, withdrawing the flange-engaging fingers from engagement with the flanges 89 upon the two ends of the mold and permitting the said mold to drop from the cradle onto the sanding barrel hereinafter described. It should be stated that at the same time that the trip 101 engages the lever 96 two other trips, 128—128 engage the projections 111 on the arms 102, thus shifting the pallet-retaining devices by moving the said arms upon their pivotal points in the opposite direction from that heretofore described in connection with the trips 118, but bringing the pallet-retaining plates 106 instantly closer to the flanges 92 as before described in connection with the said trips 118, and thus permitting the mold to freely drop from the cradle when the flange-engaging fingers 99 are actuated to release said mold.

In Fig. 2 the mold is illustrated as having just dropped into place upon the sanding barrel and the construction and operation of the sanding barrel in connection with the molds is now to be described. In bearings upon extensions of the base plate 3 is journaled the barrel shaft 129 to which is keyed and firmly attached the barrel 130 having two diametrically opposite openings in its sides, one of said openings being shown turned upwardly and the other opening downwardly in Fig. 8. The barrel is provided with a flat head at each end having an integral boss or hub located on the shaft 129 and keyed or fastened thereto. At one end the shaft 129 is extended through the bearing and upon it is fixedly mounted the sprocket 131. Upon the main shaft 6 is fixedly mounted the gear 132 provided with teeth for a portion only of its circumference. Upon the base plate 3 is erected the bearing 133 and in said bearing is journaled a short shaft having fixedly mounted thereon the gear 134 and the sprocket 135. The gear 134 is provided at two places upon its circumference with teeth and in two other places upon its circumference the teeth are broken away. The gears 132 and 134 are adapted to mesh with each other and together constitute a double intermittent gear so that continuous rotation of the shaft 6 with the sprocket 132 will produce intermittent rotation of the gear 134 and the sprocket 135 mounted upon the same shaft therewith, one complete rotation of the gear 132 producing one half-revolution of the gear 134, and the gear 134 remaining at rest while the gear 132 is performing the greater part of its rotation. The movements of the gear 134 and the sprocket 135 connected therewith are transmitted to the sprocket 131 and the sanding barrel 130 connected therewith by means of the chain belt 136. At the opposite end of the shaft 129 from that on which the sprocket 131 is mounted the ratchet cam 137 is fixedly mounted and the pivoted pawl 138 is adapted to engage said ratchet cam, permitting the barrel 130 to revolve in its appropriate direction, but upon the completion of each half-revolution of said barrel preventing any backward rotation which the said barrel may have a tendency to make by reason of the overweight of sand in said barrel as shown in Fig. 2 or for other reasons. A positive half-revolution and a positive period of rest is thus assured.

Within each opening in the sides of the barrel 130 is arranged the mold-supporting flange 139, which flange extends along the sides of said opening as well as across the ends of the same and is attached to the sides and ends of the barrel proper. Each opening of the barrel is provided with the same mechanism or devices and for this reason one of said openings will alone be considered. Along one side of the opening and beyond the flange 139 is located the mold-throwing shaft 140, which extends from end to end of the barrel and is journaled in appropriate bearings at each of said ends. Upon one end of the shaft 140 is arranged the cam lever 141 which is fixedly mounted upon said shaft and is adapted to engage the trip 142, which is fixedly attached to the base 3 as shown in Fig. 8. As the barrel 130 is rotated and just before the opening has reached its uppermost position the said cam lever 141 engages the said trip 142 and gives to the shaft 140 a twist or partial rotation. Fixedly mounted upon the shaft 140 are the mold-throwing fingers 143—143 which extend across the opening of the sanding barrel and lie in depressions in the flange 139, thus bringing their upper surfaces in a plane with the upper surface of the said flange. The said fingers are provided with projections or stops 144 for the purpose hereinafter described. For the purpose of returning the shaft 140 to its normal position with the fingers 143 lying in the depressions in the flange 139 the spring 145 is provided, which spring is attached to the shaft 140, is wound about said shaft, and has its other end attached to the wall of the barrel 130. At the time when the mold drops from the dumping cradle 66 on to the sanding barrel the sanding barrel and its parts are in the position shown in Fig. 8, the cam lever 141 having already passed the trip 142 and the fingers 143 being in place so that the mold may drop upon the flange 139. The mold having been dropped upon the flange 139 is held against lateral displacement by the stops 144 and the flange 146, the same being an extension of the side of the barrel 130. The ends of the barrel are extended into the end flanges 147—147, which prevent longitudinal displacement of the mold. For the purpose of holding the mold in place against the flange 139 and preventing it from dropping out of engagement with said flange during the rotation of the barrel, the mold-retaining fingers 148—148 are provided. Each of these fingers is fixed upon a short shaft 149 journaled in appropriate bearings arranged upon the head of the barrel. Intermediate the said bearings the spring 150 is provided. Said spring is attached at one end to the shaft 149, is wound about said shaft, and has its other end attached to the head of the barrel in such way that the action of the said spring normally holds the mold-retaining finger 148 extended longitudinally of the barrel 130 and inwardly, or in other words over the bottom of the mold, the said finger being located at a sufficient distance from the flange 139 so that the mold may be located between the said flange and the said finger when the finger is extended as just described. Upon the shaft 149 is fixedly arranged the cam lever and stop 151, which is preferably of the form illustrated in Fig. 8. The said cam lever and stop is provided with an integral portion 152 adapted to engage the end of the barrel and limit the action of the spring 150, thus causing the said spring to hold the finger 148 normally in the position to engage the bottom of the mold, as described. Another integral portion 153, is adapted to engage the trip 154 for the purpose of rotating the shaft 149 within its bearings and throwing the finger 148 out of engagement with the bottom of the mold and into a position practically in line with the plane of the end of the barrel. The said trip 154 is preferably of the form illustrated in Fig. 8 and has a curved or beveled portion adapted for engagement with the portion 153 of the cam lever and stop and is adapted to give the said portion sufficient throw to disengage the finger 148 from the bottom of the mold as just described.

For the purpose of jarring the mold to disengage any undue amount of sand which may stick to it after having been revolved with the sanding barrel a knocking mechanism is provided, which mechanism is adapted to jar the said mold as the barrel approaches the position shown in Fig. 8 and just previous to the throwing over of the mold as hereinafter described. The knocking mechanism consists of a lever 155 which lever is provided at its lower end with the right angled integral extension 156 and at its upper end with the head or hammer portion 157. At the point 158 the lever 155 is pivotally attached to the head of the barrel and at the point 159 the spring 160 is attached to the lever 155, the other end of said spring being attached to the barrel 130 for the purpose of bringing the head 157 into engagement with the end of the mold. The trip 161 is provided and fastened to the same support as that to which the trip 154 is fastened. As the barrel revolves the extension 156 engages the trip 161, rocking the lever 155 upon its pivotal point and stretching the spring 160. As the extension 156 passes the said trip and is released from engagement therewith the spring 160 draws the lever 155 toward the head of the barrel, the head 151 of said lever striking the end of the mold a sharp blow, thus jarring the same and loosening the superfluous sand before mentioned. The mold having been dropped into place upon the sanding barrel as illustrated in Fig. 2, the operation of the portion of the machine now in consideration is as follows: The main shaft 6, continuing to revolve, will cause the teeth of the gear

132 and the teeth of the gear 134 to engage each other and begin the rotation of the barrel 130 upon its shaft. Shortly after the commencement of the said rotation the portions 153 of the cam lever and stops become disengaged from the trips 154 and the springs 150 immediately act to throw the fingers 148 over the bottom edge of the mold to keep it in place. The interior of the barrel 130 is partially filled with sand, as illustrated in Fig. 2, and as the side of the barrel holding the mold approaches the bottom position the said sand will be caused to enter the said mold, entirely filling it, (see Fig. 2). The barrel will remain in this position for some time because of the operation of the intermittent gears but will later be again rotated to bring the mold again to the top. When this second portion of the rotation is nearing its completion the lever 155 is actuated to loosen any superfluous sand remaining in the mold as heretofore described. The trips 154 will then actuate the cam levers and stops and disengage the mold enagaging fingers 148 from the bottom of the mold. Continuing the rotation, the cam lever 141 will engage the lever 142 thus suddenly partially rotating the shaft 140 and the mold throwing fingers 143 connected thereto. This operation is readily understood from a study of Fig. 9 which illustrates the said cam lever in engagement with the said trip 142 and shows the mold-throwing fingers 143 in the act of throwing or dumping over the sanded mold onto the inclined conveyer. Immediately after the mold has thus been thrown, the further rotation of the barrel 130 causes the cam lever 141 to be disengaged from the trip 142 and the spring 145 returns the shaft and mold throwing fingers to the position shown in Fig. 8, at which time the barrel is ready to receive another mold from the dumping cradle, as heretofore described.

Upon the base plate 3 are arranged the supports 162 in pairs of two each and between the two supports of each pair is journaled an idler pulley 163. Upon each support 162 is arranged a projection 164 adapted to receive the corner of the mold when the same is dumped or thrown from the sanding barrel and to relieve the chains of the inclined conveyer from any undue shock by reason of the throwing of said mold upon them. The chain belts of the inclined conveyer are preferably two in number, 165—165, each belt passing over an idler, 163, and extending in an inclined, upward, direction to the edge of the mold receiving table 166, over an idler, 167, journaled thereto, and around a portion of the circumference of the sprocket 53 by which the chain is actuated. Upon the said chain are arranged appropriate mold-engaging fingers, 168, adapted to engage the side of the mold in carrying it up the inclined chain, as shown in Fig. 2. It will be remembered that the sprockets 53 are fixedly mounted upon the shaft 50 and rotate therewith in an intermittent manner, as heretofore described.

Upon the base plate 3 are mounted the table supports 169 and 170 respectively. Each of these supports is provided at its upper end with a yoke portion, providing bearings for a longitudinal conveyer mechanism as well as means of support for the table 166. The upper surface of the table 166 is plain with the exception of a longitudinal groove, along and through which moves the chain belt 171 of the longitudinal conveyer constituting a part of the said conveyer mechanism. Along the side of the table opposite the idlers 167 is a ledge or flange 172 adapted to prevent the molds from being pushed too far across the said table and also to guide the molds while being conveyed by the chain belt 171. Between the arms of the yoke portion of the support 169 is journaled the idler pulley 173 over which the chain 171 runs. Mounted in bearings in the yoke portion 170 is the shaft 174 upon which is fixedly mounted, intermediate the arms of the said yoke portion, the sprocket 175 around which the chain 171 runs, and which is adapted to actuate said chain. Upon the shaft 174 is also fixedly mounted the sprocket 176 which is connected to the sprocket 177 by the chain belt 178. Upon the chain 171 are arranged mold engaging fingers, 179, for the purpose of engaging one end of a mold in conveying the same longitudinally from the table 166 onto the table of the brick press as hereinafter more fully described.

In the bearing 180 arranged upon the base-plate 3 is rotatably mounted a short shaft upon which the sprocket 177 and the gear 181 are fixedly mounted. In other suitable bearings arranged upon the base-plate 3 the shaft 182 is rotatably mounted, and upon one end of said shaft is fixedly mounted the gear 183 adapted to mesh with the gear 181. The gears 181 and 183 are provided with teeth for but a portion of their circumference and together constitute an intermittent gear, continuous rotation of the shaft 182 producing intermittent rotation of the gear 181, and through the intermediate mechanism producing intermittent movement of the chain belt 171. Upon the shaft 182 is arranged the beveled gear 184 which meshes with a beveled gear 185 mounted upon the main shaft 6, the two gears thus serving to produce continuous rotation of the shaft 182 by the continuous rotation of the shaft 6.

Reference is now made to Fig. 1 where it will be seen that the table 166 is arranged opposite the receiving table 186 of the brickmaking machine 1. The conveyer mechanism upon the table 166 is designed to move the mold longitudinally off of said table and onto the table 186, into the position shown in full lines in Fig. 1. The chain belt 171 will not, however, convey the said mold the required distance and for the purpose of effecting this object an auxiliary conveyer is provided. This auxiliary conveyer consists of a bar 187 slidably arranged within keepers 188—188 upon the underside of the table 166. Formed integrally with the bar 187 and extending downwardly therefrom is the portion 189, to the lower end of which is pivotally connected the pitman 190. This pitman is provided with a right-angled extension of its opposite end, which extension is provided with a bearing in which is journaled a wrist pin or screw 191 which is fixed to the gear 183. It is evident that rotation of the gear 183 will produce a reciprocating movement of the pitman 190 and that said reciprocating movement will be imparted to the bar 187 which will be in continuous reciprocating movement while the shaft 182 is in rotation. At the end of the table 166 adjacent the brickmaking machine the slot 192 is provided for the accommodation of the reciprocating, mold engaging dog 193 which is pivoted to the bar 187 at the point 194. In the bar 187 the pins 195 and 196 are fastened, which pins are for the purpose of limiting the pivotal movement of the dog 193. The portion 197 of the dog 193 is made of sufficient size to produce weight in said portion sufficient to normally hold the dog in the position shown in Fig. 11. As the chain belt 171 moves the mold toward the end of the table 166 the reciprocating bar 187 being moved in the opposite direction from the direction of travel of the said mold, the upper end of the dog 193 will engage the bottom of said mold and the said dog moving upon its pivotal connection will ride along the bottom of said mold until it has passed beyond the end of the same, when the portion 197 will bring the dog into the position shown in Fig. 11, and upon the forward motion of the bar 187 the said dog will engage the mold, the pin 196 preventing the dog from moving further upon its pivotal connection, and will push the said mold longitudinally into the appropriate position on the table 186 as shown in full lines in Fig. 1. Although the slot 192 in the table 166 may provide sufficient travel for the dog 193 yet in some instances it may be desirable to arrange a slot 198 in the table 186 of the brick making machine so as to permit the said dog to move the mold into its appropriate position. When the mold has been thus delivered onto the receiving table of the brickmaking machine it is ready to enter the said machine and begin the cycle of work hereinbefore described.

Erected upon the table 30 is a support 199 to which are attached the scraper 200 and the chute 201. As seen in Fig. 1 the scraper is adapted to engage the upper surface of the knife near the edge and is for the purpose of scraping off from said knife the superfluous clay which will accumulate thereon by reason of the stroking off of the said clay from the top edges of the bricks as they pass underneath the knife. The scraper 200 is of such shape that the superfluous clay scraped off is directed over the edge of the knife and deposited in the chute 201 which is adapted to direct its further movements to a suitable place, (202).

It should be stated that the speed of the entire machine hereinbefore described is not great, the rate of rotation of the main shaft 6 preferably being about 12 revolutions per minute.

A machine of the character described having been provided and arranged in proper relation to a brickmaking machine the operation of the same is as follows: The empty mold having been filled and pressed by the brickmaking machine the said mold is pushed out upon the table 2 by the said machine and as it passes underneath the edge of the circular stroking off knife 21, the said knife is caused to rotate by the gears 26 and 27, the edge of the said knife thus shaving off the superfluous clay across the top edges of the brick and carrying the same to the scraper 200 which removes it from the knife and deposits it in the chute 201, as hereinbefore described. The mold proceeding drops off of the table 2 and onto the table 30 which is slightly lower than the table 2. At this point the knife 21 ceases to rotate by reason of the action of the intermittent gear composed of the gears 26 and 27 and at the same time the sprocket 33 is put in rotation by the operation of the intermediate gear composed of the gears 34 and 35, thus bringing the adjustable fingers 39 on the conveyer chain 38 into engagement with the end of the mold and sliding the same longitudinally onto the rapping table 40, after which the sprocket 33 ceases to rotate by reason of the action of the said intermittent gear in connection therewith. At this point the pushing levers 43 begin to move, being actuated by the intermittent gear composed of the gears 52 and 55, and the mold will thus be pushed into a position between the rapping hammers 60, which are in continuous operation, each making one stroke for every complete revolution of the main shaft 6. The mold will not remain between the rapping hammers for any considerable length of time, for another mold will have been brought onto the rapping table by the conveyer chain 38 and the pushing levers 43 will be again actuated to bring the second mold into position between the rapping hammers, thus pushing the mold already rapped off of the said rapping table and onto the dumping cradle, which is at that instant in the position shown in Fig. 2. Just before the mold is pushed onto said dumping cradle the pallet 203 should be placed upon the top of the mold by an attendant as hereinbefore described and the said pallet will enter the said dumping cradle with the mold. At the time when the mold with the pallet thereon is thus pushed onto the dumping cradle the flange-engaging fingers and the pallet-engaging plate and related devices are in the position illustrated in Fig. 5. The continued rotation of the shaft 16, which revolves at all times at a uniform speed, will cause the pitmen 71 and 73 to draw forward the dumping cradle and the sprockets 81 and 79 and the gears 80 and 72 will cause the one half-rotation of the dumping cradle while it is moved forward, the corner of the dumping cradle from which the dotted line 84 in Fig. 2 proceeds describing the path illustrated by the said dotted line 84. When the dumping cradle with the mold reversed by reason of the one half-rotation just described has reached its most forward position the trips 118 will engage the projections 111 on the pivoted arms 102, thus removing the pallet engaging plates 106 from their engagement with the pallet, as hereinbefore described, and permitting the said pallet with the bricks thereon to be deposited upon the cross heads of the arms 112 which act to permit the said pallet and bricks to descend slowly and without jarring onto the conveyer chains 119. The said chains being in continuous rotation, the said pallet and bricks will be carried out to the end of the machine and onto the pallet receiving rails 127—127 while the further rotation of the shaft 16 will return the dumping cradle without further rotation of the same to the position shown in Fig. 2, or in other words to its most rearward position. At this time the cradle bottom which is turned upward will be ready to receive another mold from the rapping table while at the same time the trip 101 will engage the lever 96 to actuate the flange engaging fingers of the lower cradle bottom to release the mold therefrom while the trips 128 will actuate the pivoted arms 102 to throw the pallet engaging plate 106 nearer the flanges 92 to permit the said mold to drop freely into place upon the sanding barrel. At the time the said mold drops upon the said sanding barrel the said sanding barrel is in the position illustrated in Fig. 8 and by the further rotation of the main shaft 6 the gears 132 and 134 are thrown into mesh and the revolution of the sanding barrel is commenced. The said revolution progresses but a short space when the mold retaining fingers 148 are thrown into engagement with the bottom of the mold and remain in such engagement until the said mold is brought again nearly to its top or upward position as hereinbefore fully described. As the said mold is brought to the top position it is released from said barrel and thrown by the mold throwing fingers 143 onto the inclined conveyer consisting of the chains 165. The sanding barrel will then remain at rest until it receives another mold to be sanded, while the chains 165 will be put into motion by the operation of the intermittent gear composed of the gears 52 and 55 and the sanded mold will be conveyed upwardly as shown in Fig. 2 until it has reached the mold receiving table 166. At this point the chains 165 will come to rest while the intermittent gear composed of the gears 181 and 183 will operate to move the chain belt 171, thus sliding the mold longitudinally toward the brickmaking machine, while the bar 187 with the dog 193 pivoted thereto will be actuated to complete the delivery of the mold onto the receiving table 186 of the brickmaking machine.

It will be understood that the arrangement and timing of the gears and various moving parts of the entire machine is such that each device will operate at the proper instant and that the various parts will cooperate with each other to perform their necessary functions in as speedy a manner as possible. The brickmaking machine will be intermittently feeding re-filled molds into the off-bearing machine and the said off-bearing machine will so operate as to take care of the various molds as fast as they are fed into it, a series of molds being thus continuously entering the machine, a series of pallets and bricks being delivered onto the pallet-receiving rails and the molds from which said bricks have been taken being sanded and returned to the brickmaking machine in a similar series, all of the various operations being performed in a more or less intermittent manner as will be fully understood from the above complete description.

It will thus be seen that the off-bearing machine for brickmaking herein described is admirably adapted to accomplish the work for which it is designed and that all of the objects and purposes of the invention have been fully attained.

I claim:—

1. In a device of the character described, a stroking-off knife of flat, hollow, frusto-conical shape provided at its periphery with a cutting edge.

2. In a device of the character described, in combination with a brickmaking machine of the character described, stroking-off means comprising a table arranged adjacent to the table of the brick machine and adapted to receive molds of bricks therefrom, and a revolving, circular, horizontally disposed stroking-off knife with a peripheral cutting edge located at a lower plane than the remainder of the knife and adapted to engage the top edges of the bricks in the molds on said table.

3. In a device of the character described, in combination with the table of a brick-making machine of the character described, stroking-off means comprising a revolving, circular stroking-off knife with a peripheral cutting edge extending over and spaced upwardly from said table and adapted to engage the upper surfaces of bricks delivered onto said table by said brick machine.

4. In a device of the character described, stroking-off means comprising, in combination with two horizontally disposed tables, the first table arranged at a higher level than the second table, a circular, revolving stroking-off knife provided at its periphery with a cutting edge, said cutting edge being at a lower plane than the remainder of the knife and extending over said first table, said second table being located under said knife and nearer the center thereof, said cutting edge upwardly spaced from said first table and adapted to engage and stroke off the upper edges of bricks in molds slidably moved over said table, whereby, as said molds are slidably moved from said first table to said second table the bricks therein may be stroked off and when on said second table will be out of contact with said cutting edge and may be slidably removed therefrom without again engaging said cutting edge.

In testimony that I claim the above, I have hereunto subscribed my name in the presence of two witnesses.

HARRY C. KUNKLE.

Witnesses:
OSCAR J. METZGER,
WILLIAM H. MILLER.